(12) United States Patent  
Kiribayashi

(10) Patent No.: US 7,429,916 B2  
(45) Date of Patent: Sep. 30, 2008

(54) OBSTACLE DISCRIMINATION DEVICE FOR VEHICLE

(75) Inventor: Shinichi Kiribayashi, Anjo (JP)

(73) Assignee: DENSO CORPORATION, Kariya (JP)

( * ) Notice: Subject to any disclaimer, the term of this patent is extended or adjusted under 35 U.S.C. 154(b) by 182 days.

(21) Appl. No.: 11/251,793

(22) Filed: Oct. 18, 2005

(65) Prior Publication Data

US 2006/0087417 A1  Apr. 27, 2006

(30) Foreign Application Priority Data

Oct. 22, 2004  (JP) .............................. 2004-308453

(51) Int. Cl.  
*B60Q 1/00* (2006.01)

(52) U.S. Cl. ................... 340/436; 701/45; 180/274; 180/275; 280/735

(58) Field of Classification Search ................ 340/436, 340/536; 701/45–47; 180/274–280; 280/735  
See application file for complete search history.

(56) References Cited

U.S. PATENT DOCUMENTS 4,215,878 A * 8/1980 Hirbod ....................... 280/737

6,510,914 B2 * 1/2003 Ishizaki et al. ............... 180/274  
6,561,301 B1 * 5/2003 Hattori et al. ................ 180/274  
6,784,792 B2   8/2004 Mattes et al.  
6,948,750 B2 * 9/2005 Federspiel et al. ........... 293/109  
2005/0096816 A1 * 5/2005 Takafuji et al. ................ 701/45

FOREIGN PATENT DOCUMENTS

JP      A-11-28994      2/1999

* cited by examiner

*Primary Examiner*—Jeff Hofsass  
*Assistant Examiner*—Hongmin Fan  
(74) *Attorney, Agent, or Firm*—Posz Law Firm Group, PLC

(57) ABSTRACT

An obstacle discrimination device for a vehicle includes an absorber arranged at a front surface of a bumper reinforce member in a bumper cover of the vehicle, a pressure detection unit, a vehicle velocity detection unit and an obstacle judgment unit. The absorber has therein at least one chamber, in which fluid is sealed. A pressure in the chamber which varies due to a collision of an obstacle with a bumper of the vehicle is detected by the pressure detection unit. A pedestrian is distinguished according to whether or nor the pressure exceeds a threshold value related to a velocity of the vehicle detected by the vehicle velocity detection unit.

15 Claims, 3 Drawing Sheets

SIDE OF BUMPER COVER

SIDE OF REINFORCE MEMBER

OBSTACLE DISCRIMINATION DEVICE FOR VEHICLE

CROSS REFERENCE TO RELATED APPLICATION

This application is based on a Japanese Patent Application No. 2004-308453 filed on Oct. 22, 2004, the disclosure of which is incorporated herein by reference.

FIELD OF THE INVENTION

The present invention relates to an obstacle discrimination device for a vehicle, which sort-distinguishes an obstacle colliding with the vehicle based on a pressure variation at a bumper of the vehicle.

BACKGROUND OF THE INVENTION

Generally, an obstacle discrimination device can be mounted at a bumper of a vehicle. When an obstacle collides with the vehicle, the obstacle discrimination device discriminates whether or not the obstacle is a pedestrian. In the case where it is determined that the obstacle is the pedestrian, a pedestrian protecting device (e.g., active hood and cowl airbag) will be activated to protect the pedestrian.

That is, in the case where the obstacle colliding with the vehicle is not the pedestrian and the pedestrian protecting device (e.g., active hood) at the hood of the vehicle is activated, a variety of ill effects will be caused. For example, if a low-mass obstacle such as a triangle cone or a construction billboard colliding with the vehicle cannot be discriminated from a human (pedestrian), the pedestrian protecting device will be unnecessarily activated so that a redundant repair cost is caused. Moreover, if a weight obstacle (e.g., concrete wall and other vehicle) colliding with the vehicle cannot be distinguished from the human, the vehicle will be backed with the hood thereof being lifted so that the hood may penetrate into a passenger compartment. Thus, passengers in the vehicle are periled. Therefore, it is required to appropriately distinguish whether or not the obstacle is a pedestrian, for example, referring to JP-11-028994A and JP-11-310095A.

As described in JP-11-028994A, the pedestrian is distinguished based on a continuation time when a collision load (or deformation amount) exceeds a predetermined level. According to JP-11-310095A, the pedestrian is discriminated based on an increase rate of the collision load when the collision load exceeds a predetermined value. Moreover, referring to other art, the pedestrian is distinguished based on a peak value of the collision load.

That is, according to these related arts, the pedestrian is discriminated from other objects based on a predetermined variation component of a waveform of the collision load. In these cases, the collision load is to be corrected with respect to a velocity of the vehicle.

However, in these cases, it is necessary to mount at the vehicle bumper a load sensor for detecting the collision load exerted on the vehicle bumper by the collision obstacle, or a displacement sensor for detecting a deformation amount of the vehicle bumper, or a collision-detecting tube for detecting the collision load through a pressure variation. As a result, the mounting performance of the vehicle bumper, the bumper performance or the collision G-transmission capability for a passenger protection by an airbag will be deteriorated.

SUMMARY OF THE INVENTION

In view of the above-described disadvantage, it is an object of the present invention to provide an obstacle discrimination device for a vehicle, which appropriately sort-distinguishes an obstacle colliding with the vehicle by a simple construction without deteriorating a vehicle bumper performance or a passenger protection capability, for example.

According to the present invention, an obstacle discrimination device for a vehicle includes an absorber arranged at a front surface of a bumper reinforce member in a bumper cover of the vehicle, a pressure detection unit and an obstacle judgment unit. The absorber has at least one chamber therein. The pressure detection unit detects a pressure in the chamber. The obstacle judgment unit sort-distinguishes an obstacle colliding with a bumper of the vehicle based on a detection value of the pressure detection unit.

Therefore, when the obstacle collides with the bumper, the absorber arranged at the front surface of the bumper reinforce member is deformed and buffers the collision so that the pressure in the chamber varies. The pressure is detected by the pressure detection unit. The mass of the obstacle can be determined according to the pressure variation (e.g., peak value of pressure in collision), and the sort of the obstacle can be distinguished by the mass thereof. Accordingly, the obstacle can be appropriately sort-determined, by detecting the pressure by means of the construction of the vehicle bumper.

Preferably, the absorber is provided with a plurality of the chambers which are arrayed in a vehicle width direction in the absorber.

Therefore, when the absorber is deformed due to the collision with the obstacle, the pressure in at least one of the multiple chambers will vary. Because the volume (capacity) of the each chamber is set to be small, the pressure variation (e.g., peak value of pressure in collision) can be speedily transmitted to the pressure detection unit. Accordingly, the obstacle can be sort-distinguished in a short period after the collision occurrence.

More preferably, the obstacle discrimination device further includes a vehicle velocity detection unit for detecting a velocity of the vehicle. The obstacle judgment unit sort-determines the obstacle based on a detection value of the vehicle velocity detection unit and the detection value of the pressure detection unit.

Thus, the velocity of the vehicle can be detected by the vehicle velocity detection unit, while the pressure in the chamber is detected by the pressure detection unit. The obstacle judgment unit determines the sort of the obstacle according to both the detection value of the vehicle velocity detection unit and that of the pressure detection unit. That is, the pressure variation (e.g., peak value of pressure in collision) in the chamber is related to the mass of the obstacle and the velocity of the vehicle when colliding. Accordingly, the sort of the obstacle can be substantially distinguished based on the pressure variation and the velocity of the vehicle when colliding.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

Preferred Embodiment

Figure 1:
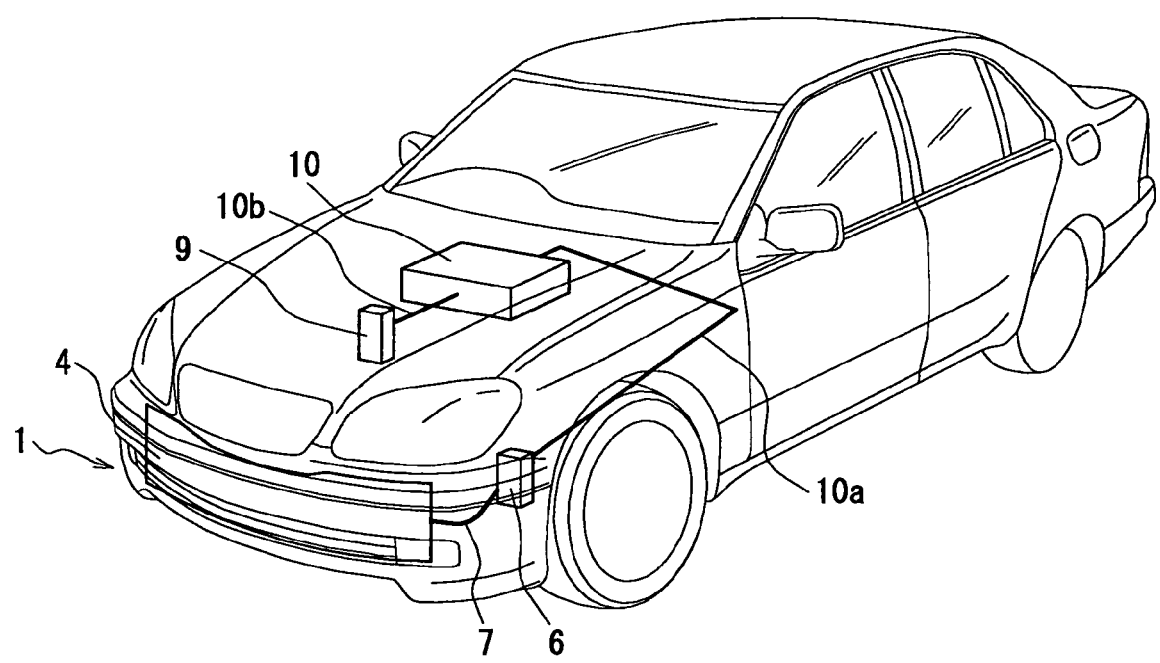
FIG. 1 is a schematic view showing a whole construction of an obstacle discrimination device for a vehicle according to a preferred embodiment of the present invention.

An obstacle discrimination device for a vehicle according to a preferred embodiment of the present invention will be described with reference to FIGS. 1-6. As shown in FIG. 1, the obstacle discrimination device is provided with an absorber 4 arranged in a bumper 1 of the vehicle, a pressure detection unit 6 (e.g., pressure sensor), a vehicle velocity detection unit 9 (e.g., velocity sensor), an obstacle judgment unit 10 (e.g., airbag ECU) and so on.

Figure 2:
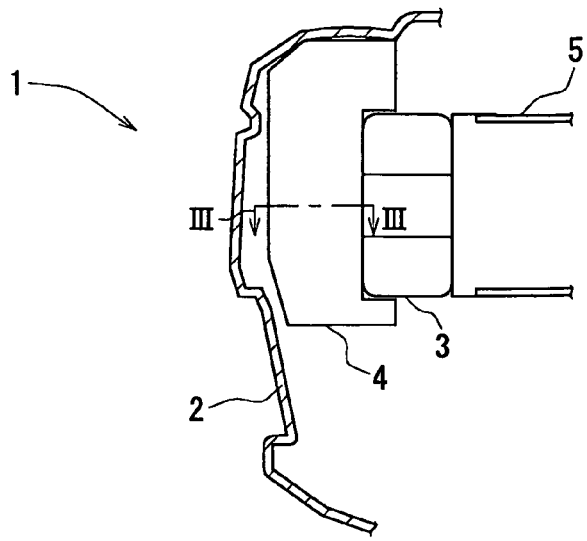
FIG. 2 is a longitudinally partially cross-sectional view of a vehicle bumper.

Referring to FIG. 2, the bumper 1 is constructed of a bumper cover 2, a bumper reinforce member 3, a pair of side members 5 and the like. The absorber 4 is attached to a front surface (at vehicle front side) of the bumper reinforce member 3 in the bumper cover 2.

The bumper cover 2 is positioned at a front end of the vehicle and extends in a vehicle width direction. The bumper cover 2, being made of a resin (e.g., polypropylene) or the like, is attached to a vehicle chassis to cover the bumper reinforce member 3 and the absorber 4.

The bumper reinforce member 3 can be made of a metal and has a substantial beam shape extending in the vehicle width direction. The bumper reinforce member 3 is disposed inside the bumper cover 2.

The side members 5, being made of a metal, are respectively positioned at two sides of the vehicle and extend in a vehicle front-rear direction. The bumper reinforce member 3 is mounted at front ends of the side members 5.

Figure 3:
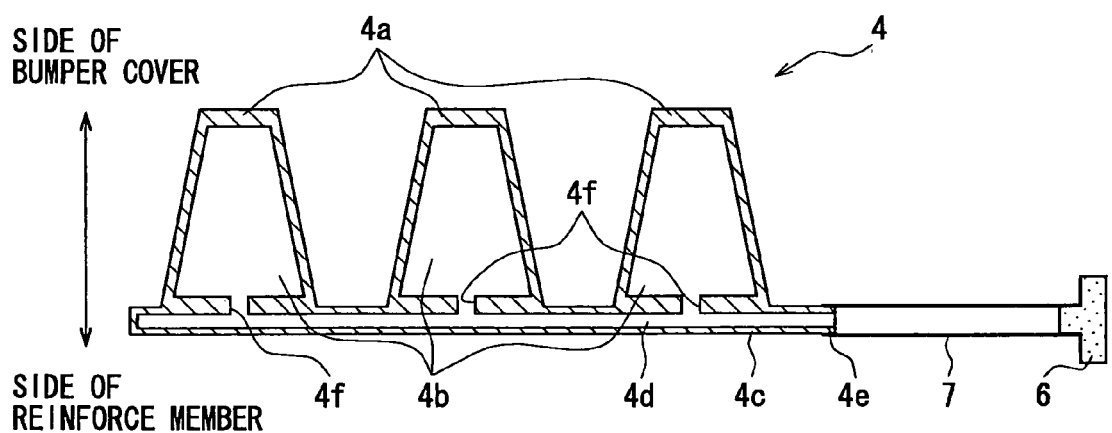
FIG. 3 is a partially cross-sectional view taken along a line III-III in FIG. 2.

The absorber 4 is mounted at the front surface of the bumper reinforce member 3 in the bumper cover 2, for a pressure transmission and a collision absorption at the bumper 1. The absorber 4 can be made of a metal (e.g., iron plate), a resin or the like. Referring to FIG. 3, the absorber 4 includes a connection portion 4c, and multiple chamber portions 4a arrayed in the vehicle width direction. Each of the chamber portions 4a has a block shape tapering toward one end (at side of bumper cover 2) thereof. That is, the chamber portion 4a has a substantially trapezoid-shaped cross section. A predetermined gap is arranged between the adjacent chamber portions 4a. Each of the chamber portions 4a is connected with the connection portion 4c at other end (at side of bumper reinforce member 3) of the chamber portion 4a.

Each of the chamber portions 4a has therein a chamber 4b (i.e., hollow space), in which air is filled. The connection portion 4c is provided with therein a cavity 4d to have a hollow construction, and extends in the vehicle width direction. One extending-direction end of the connection portion 4c is a closed end, and other end thereof is an opening end 4e communicated with the cavity 4d. The opening end 4e is connected to the pressure detection unit 6 through a tube 7 or the like.

A communication hole 4f is formed at the joint between the each chamber portion 4a and the connection portion 4c, so that air (sealed in absorber 4) can flow in the chambers 4b of the chamber portions 4a and the cavity 4d of the connection portion 4c through the multiple communication holes 4f. That is, the chambers 4b, the cavity 4d and the tube 7 are communicated with each other, so that the air pressure in the chamber 4b can be transmitted to the pressure detection unit 6.

Figure 4:
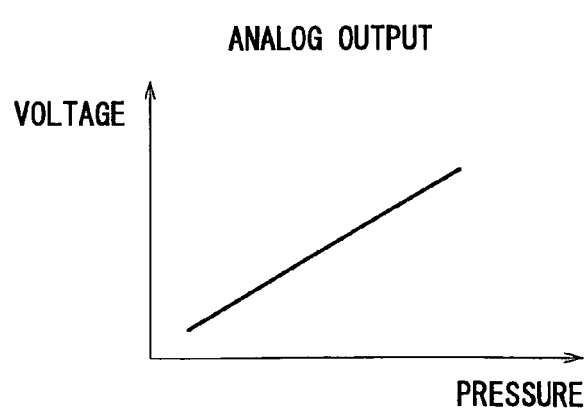
FIG. 4 is a graph showing a relation between an analog voltage output and a pressure of a pressure sensor.

The pressure detection unit 6 (e.g., pressure sensor) is constructed to be capable of detecting the air pressure. In this case, the air pressure in the chambers 4b is detected by the pressure sensor 6 through the connection portion 4c and the tube 7. As shown in FIG. 4, the pressure sensor 6 provides an analogue output of a voltage in proportion to the air pressure. The pressure sensor 6 is electrically connected with the airbag ECU 10 through a transmission member 10a (e.g., transmission lead).

The vehicle velocity detection unit 9 (e.g., velocity sensor) is attached to the vehicle to detect a traveling velocity of the vehicle, and electrically connected with the airbag ECU 10 through a transmission member 10b (e.g., transmission lead).

The airbag ECU 10 is an electronic control unit controlling a deployment of an airbag which is provided to protect a pedestrian (not shown), for example. Signals output by the pressure sensor 6 and the velocity sensor 9 are input to the airbag ECU 10, respectively through the transmission members 10a and 10b. According to this embodiment, the airbag ECU 10 sort-determines the obstacle colliding with the bumper 1 (that is, discriminates pedestrian from other), based on the air pressure (detected by the pressure sensor 6) and the vehicle velocity value (detected by the vehicle velocity sensor 9) when the vehicle collides with the obstacle.

Next, it will be described an obstacle discrimination by the obstacle discrimination device when an obstacle collides with the bumper 1 of the vehicle.

Figure 5:
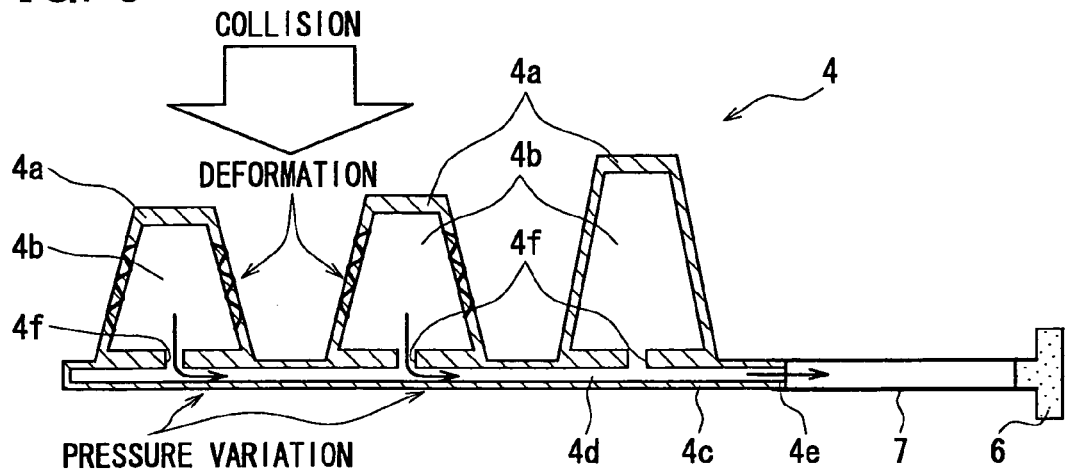
FIG. 5 is a schematic sectional view showing a deformation of an absorber and a pressure variation therein when an obstacle collides with the vehicle.

Referring to FIG. 5, when the obstacle collides with the bumper 1, the part of the chamber portion 4a at which an impact is exerted is deformed (possibly crushed). Thus, the pressure in the chamber 4b is increased to have a peak value. The pressure variation (e.g., peak value of pressure) in the chamber 4b is related to the deformation amount of the absorber 4. The pressure in the chamber 4b is detected by the pressure sensor 6 through the communication hole 4f, the connection portion 4c and the tube 7. The airbag ECU 10 reads in the vehicle velocity signal from the velocity sensor 9 through the transmission member 10b, and the voltage signal (analog output) from the pressure sensor 6 through the transmission member 10a. The airbag ECU 10 determines whether or not the obstacle is a human (pedestrian), according to whether or not the voltage signal (corresponding to pressure in chamber 4) from the pressure sensor 6 exceeds a threshold value predetermined based on a velocity of the vehicle when colliding.

Figure 6:
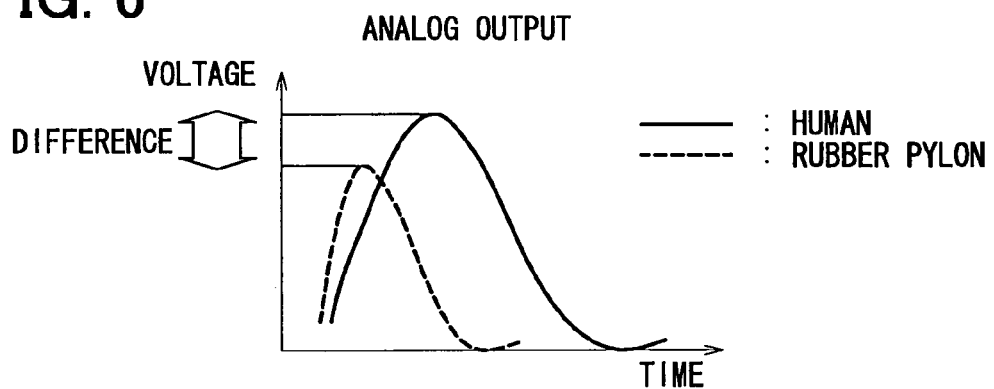
FIG. 6 is a graph showing the analog voltage outputs of the pressure sensor in the cases where a human and a rubber pylon respectively collide with the vehicle.

For example, FIG. 6 shows the difference between the analog outputs of the pressure sensor 6 in the cases where the bumper 1 collides respectively with a human and other obstacle such as a rubber pylon. Referring to FIG. 6, the analog outputs corresponding to the human and the rubber pylon have different peak vales, because the human has a mass level different from the obstacle other than it. For example, the mass of the human is larger than that of the rubber pylon.

Thus, a threshold value can be set between the peak values of the analog outputs of the pressure sensor 6 corresponding to the human and the other obstacle (e.g., rubber pylon), for a sort-discrimination of the obstacle. Because the analog output (related to deformation amount of absorber 4) of the pressure sensor 6 is determined by not only the mass of the obstacle but also the velocity of the vehicle when colliding, the threshold value for distinguishing the sort of the obstacle is set also based on the vehicle velocity value detected by the velocity sensor 9.

According to this embodiment, when an obstacle collides with the bumper 1, the absorber 4 which is mounted at the front surface of the bumper reinforce member 3 is deformed to absorb the impact. In this case, the air pressure in the chamber 4b varies due to the deformation of the absorber 4. The air pressure (including the peak value thereof) is detected by the pressure sensor 6. Thus, the airbag ECU 10 can substantially determine whether or not the obstacle is the pedestrian, based on the pressure detected by the pressure sensor 6 and the vehicle velocity value detected by the velocity sensor 9.

That is, according to this embodiment, the air pressure (varying in collision) in the chamber 4b is detected by means of the simple construction of the vehicle bumper 1, so that the obstacle can be appropriately sort-distinguished. Thus, the obstacle discrimination device according to the present invention has a simpler structure and a lower cost, as compared with the case where a tube for transmitting the pressure is separately arranged between a bumper reinforce member and a conventional impact-absorbing absorber (made of foamed resin, urethane foam or the like).

Furthermore, according to this embodiment, the multiple chambers 4b are arrayed in the vehicle width direction in the absorber 4. The air pressure in any one of the chambers 4b can be substantially detected by the pressure sensor 6 through the connection portion 4c and the tube 7. Because the each chamber 4b is set to have a relatively small volume, the air pressure therein which varies in the collision can be rapidly transmitted to the pressure sensor 6. Thus, the obstacle can be sort-distinguished during a short period after the collision occurrence.

Moreover, because what is sealed in the absorber 4 is air, it is unnecessary for the absorber 4 to be completely hermetic. The hermetic extent of the absorber 4 is only required to be capable of generating a temporary variation of the air pressure in the chamber portion 4a due to the deformation of the absorber 4.

Figure 7:
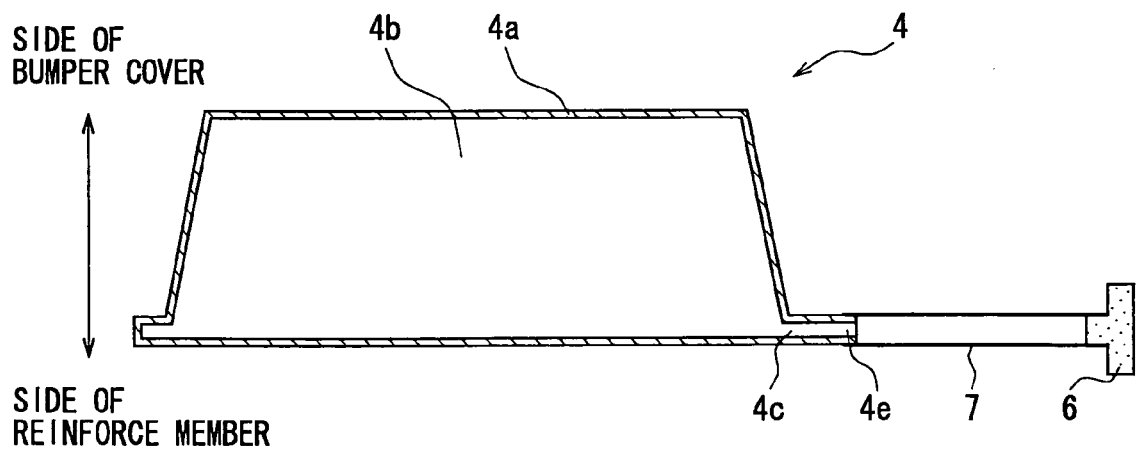
FIG. 7 is a partially cross-sectional view showing a construction of an absorber according to a modification of the preferred embodiment.

In the preferred embodiment, the multiple chamber portions 4a are formed in the absorber 4. According to a modification of this embodiment, the absorber 4 can be also provided with the single chamber portion 4a therein, referring to FIG. 7. In this case, the chamber portion 4a extends in the vehicle width direction, and has the chamber 4b therein. That is, there exists the single chamber 4b in the absorber 4. When an obstacle collides with the bumper 1 so that the absorber 4 is deformed, a variation of the air pressure occurs in the single chamber 4b. The air pressure is substantially detected by the pressure sensor 6. In this case, because the chamber portion 4a has a simple shape extending in the vehicle width direction, the construction of the absorber 4 can be considerably simplified.

Other Embodiment

Although the present invention has been fully described in connection with the preferred embodiments thereof with reference to the accompanying drawings, it is to be noted that various changes and modifications will become apparent to those skilled in the art.

In the preferred embodiment, air is sealed in the absorber 4. However, gas other than air can be also sealed in the absorber 4. Alternatively, liquid (e.g. oil) can be also sealed in the absorber 4. In this case, the pressure detection unit 6 is constructed to be capable of detecting a liquid pressure. Because the variation of the liquid pressure due to temperature is smaller than that of the gas pressure due to temperature, the obstacle discrimination can be performed more appropriately without being limited by a temperature condition.

In the above-described embodiment, the airbag ECU 10 is used to determine the sort of the obstacle colliding with the vehicle. However, other control unit can be also used.

Such changes and modifications are to be understood as being in the scope of the present invention as defined by the appended claims.

What is claimed is:

1. An obstacle discrimination device for a vehicle, comprising:
    an absorber arranged at a front surface of a bumper reinforce member in a bumper cover of the vehicle, the absorber having at least one chamber therein;
    a pressure detection unit which detects a pressure in the chamber, and
    an obstacle judgment unit for soft-distinguishing an obstacle colliding with a bumper of the vehicle based on a detection value of the pressure detection unit,
    wherein the at least one chamber has a block shape tapering toward one end of the block shape.

2. The obstacle discrimination device according to claim 1, wherein the absorber is provided with a plurality of the chambers which are arrayed in a vehicle width direction in the absorber.

3. The obstacle discrimination device according to claim 1, wherein the absorber is provided with the single chamber extending in a vehicle width direction in the absorber.

4. The obstacle discrimination device according to claim 1, wherein:
    gas is sealed in the absorber; and
    the pressure detection unit detects the pressure of the gas.

5. The obstacle discrimination device according to claim 1, wherein:
    liquid is sealed in the absorber; and
    the pressure detection unit detects the pressure of the liquid.

6. The obstacle discrimination device according to claim 1, further comprising
    a vehicle velocity detection unit for detecting a velocity of the vehicle, wherein
    the obstacle judgment unit sort-distinguishes the obstacle based on a detection value of the vehicle velocity detection unit and the detection value of the pressure detection unit.

7. The obstacle discrimination device according to claim 1, further comprising
    a tube, wherein:
    the absorber includes a connection portion and at least one chamber portion, which is provided with the chamber therein and connected with the connection portion at one end of the chamber portion, the one end being at a side of the bumper reinforce member; and
    the connection portion extends in a vehicle width direction and has therein a cavity, which is communicated with the chamber and has an opening end connected to the pressure detection unit through the tube.

8. The obstacle discrimination device according to claim 7, wherein the chamber portion has a block shape tapering toward other end thereof, the other end being at a side of the bumper cover.

9. The obstacle discrimination device according to claim 4, wherein the gas sealed in the absorber is air.

10. The obstacle discrimination device according to claim 6, wherein the obstacle judgment unit determines whether or not the obstacle is a pedestrian, according to whether or not the detection value of the pressure detection unit exceeds a threshold value, the threshold value being related to the velocity of the vehicle detected by the vehicle velocity detection unit.

11. The obstacle discrimination device according to claim 1, wherein the obstacle judgment unit is an airbag ECU of the vehicle.

12. The obstacle discrimination device according to claim 1, wherein the pressure detection unit is a pressure sensor.

13. The obstacle discrimination device according to claim 6, wherein the vehicle velocity detection unit is a velocity sensor.

14. The obstacle discrimination device according to claim 1, wherein the at least one chamber has a substantially trapezoid cross section.

15. The obstacle discrimination device according to claim 1, the block shape of the at least one chamber tapering smoothly from a side of the bumper reinforce member to become smaller toward a side of the bumper cover.

* * * * *